(12) United States Patent
Govindarajan et al.

(10) Patent No.: US 12,321,642 B2
(45) Date of Patent: Jun. 3, 2025

(54) FLASH MEMORY ACCESS SCHEDULING

(71) Applicant: TEXAS INSTRUMENTS INCORPORATED, Dallas, TX (US)

(72) Inventors: Sriramakrishnan Govindarajan, Bangalore (IN); Vignesh Raghavendra, Bangalore (IN); Mihir Mody, Bangalore (IN); Mohammad Asif Farooqui, Bangalore (IN); Shailesh Ghotgalkar, Bangalore (IN); Sai Rajaraman, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 4 days.

(21) Appl. No.: 18/359,729

(22) Filed: Jul. 26, 2023

(65) Prior Publication Data

US 2025/0036315 A1 Jan. 30, 2025

(51) Int. Cl.
*G06F 3/06* (2006.01)

(52) U.S. Cl.
CPC .......... *G06F 3/0659* (2013.01); *G06F 3/0622* (2013.01); *G06F 3/0679* (2013.01)

(58) Field of Classification Search
CPC ............................. G06F 13/1605; G06F 13/18
See application file for complete search history.

(56) References Cited

U.S. PATENT DOCUMENTS 6,173,378 B1 * 1/2001 Rozario ................. G06F 13/18
710/5

* cited by examiner

*Primary Examiner* — Yong J Choe
(74) *Attorney, Agent, or Firm* — Xianghui Huang; Frank D. Cimino

(57) ABSTRACT

Various examples disclosed herein relate to trimming of system elements to prepare the elements for execution of boot code and application code. In an example embodiment, a system is provided. The system includes memory access circuitry and processing circuitry coupled to the memory access circuitry. The memory access circuitry is configured to receive a read request corresponding to a set of instructions for execution by processing circuitry stored in non-volatile memory, determine whether to preempt current access to the non-volatile memory corresponding to one or more access requests in favor of the read request based on a priority of the read request relative to the one or more access requests, obtain the set of instructions from the non-volatile memory, and supply the set of instructions to the processing circuitry. The processing circuitry executes the set of instructions.

20 Claims, 6 Drawing Sheets

FLASH MEMORY ACCESS SCHEDULING

TECHNICAL FIELD

This relates generally to prioritizing requests from one or more processors to access memory.

BACKGROUND

Microcontroller units (MCUs) are designed to run software programs and perform functions enabled by running the software programs. To do so, MCUs can include processing cores configured to execute software and memory coupled with the processing cores that stores the instructions and data of the software. For example, MCUs can have one or more central processing units (CPUs) that communicate with random access memory (RAM) to execute such software programs. If a software program is too large to be executed from RAM, the MCU may additionally utilize non-volatile memory, such as flash memory, that has a larger capacity to store instructions and data related to the software. MCUs generally execute software programs with greater speed and reduced latency from RAM, however, increasing complexity and size of the programs may require the MCU to execute from RAM and/or flash memory to perform the task.

Executing program instructions directly from flash memory may also be referred to as execute-in-place ("XIP"). To utilize flash memory, traditional solutions may include multiple flash memory instances in a system architecture. One flash memory may be used to perform write requests from an on-chip memory, for example, to the flash memory, while another flash memory may be used to perform read requests from the flash memory to the on-chip memory. However, such solutions are costly due to the need for multiple flash memories. Other solutions may utilize a single flash memory. In such cases, a prioritization mechanism is required to determine which read and write requests may take priority over the others. Although multiple requests from a single processing core can be interleaved, such solutions fail to account for performance inefficiencies when prioritizing one request over another.

SUMMARY

Disclosed herein are improvements to prioritization and preemption of access to memory. An access request may include a read request, a write request, and/or an execution request. In environments including multiple processing cores that may each attempt to access a non-volatile memory in executing program code, prioritization of various access requests may be performed to reduce latency and increase processing throughput. In an example embodiment, a system is provided. The system includes memory access circuitry and processing circuitry coupled to the memory access circuitry. The memory access circuitry is configured to receive a read request corresponding to a set of instructions for execution by processing circuitry stored in non-volatile memory, determine whether to preempt current access to the non-volatile memory corresponding to one or more access requests in favor of the read request based on a priority of the read request relative to the one or more access requests, obtain the set of instructions from the non-volatile memory, and supply the set of instructions to the processing circuitry. The processing circuitry executes the set of instructions.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter.

BRIEF DESCRIPTION OF THE DRAWINGS

The drawings are not necessarily drawn to scale. In the drawings, like reference numerals designate corresponding parts throughout the several views. In some examples, components or operations may be separated into different blocks or may be combined into a single block.

DETAILED DESCRIPTION

Figure 1:
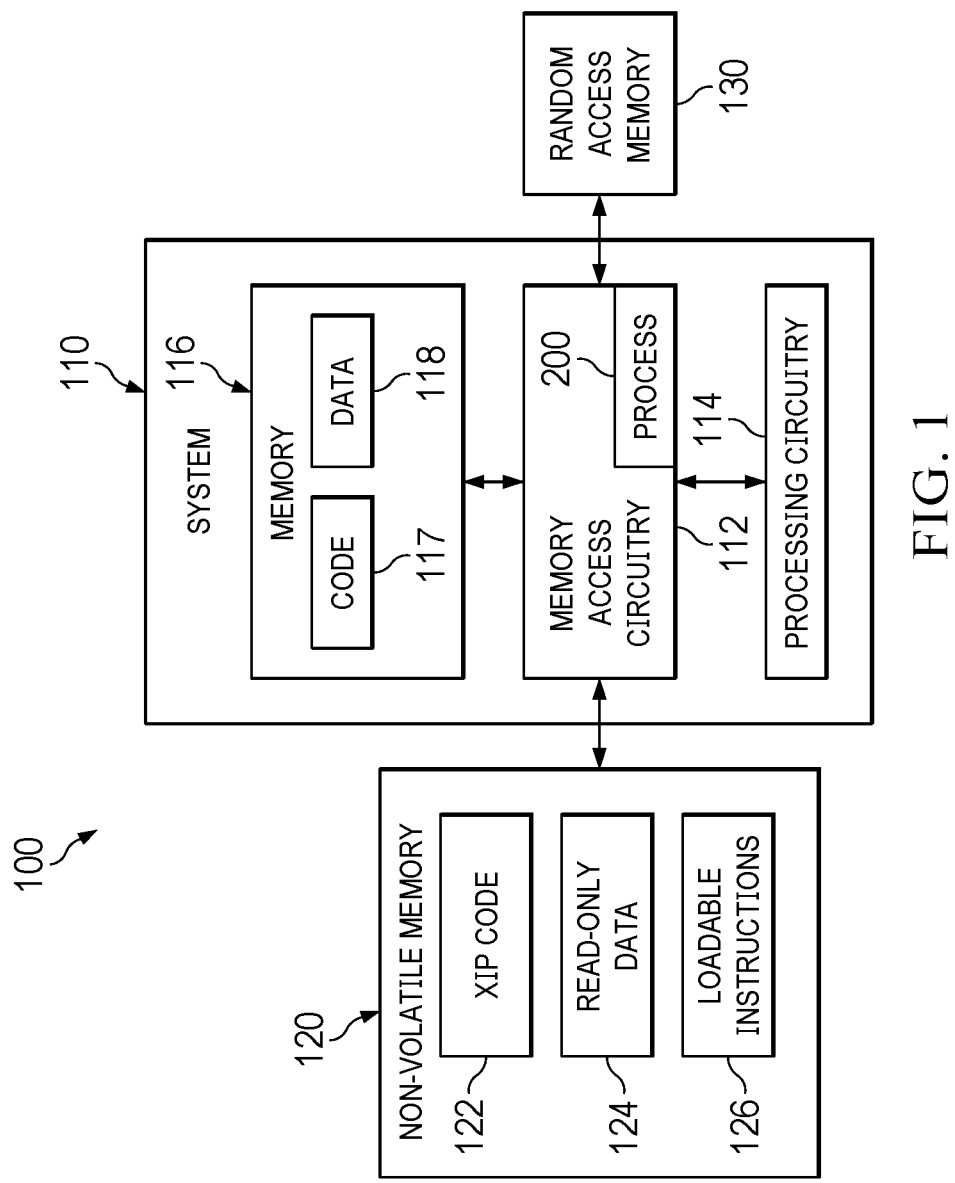
FIG. 1 illustrates an example operating environment for scheduling access to memory in accordance with an implementation.

Discussed herein are enhanced components, techniques, and systems related to prioritization and preemption of access to memory by one or more processors. A processor can be tasked with executing software to enable functionality of an application, device, or system. However, the processor may lack the ability to execute all of the code and data of the software from internal (e.g., volatile) memory under design restraints, costs, and other considerations. Thus, non-volatile memory, such as flash memory, may be included in a system external to the processor. In such systems, some code and data may be stored in internal memory (e.g., RAM) at runtime, while other code and data may be stored in external non-volatile memory (e.g., flash memory) at runtime. The processor may attempt to access both the internal memory and the external memory during execution of software. In various examples, a processor may have multiple processing cores simultaneously executing code and performing reads and writes using the external flash memory. Problematically, previous solutions fail to provide prioritization techniques for requests among multiple processors. Additionally, such prioritization techniques fail to weigh factors among various flash memory access requests such as whether a request is for real-time execution, an interrupt or critical request, or whether one or more requests corresponding to one of the processors is being performed at a threshold rate or not.

A system discussed herein can monitor states of multiple processors of a system, the addresses attempted to be accessed by the multiple processors, and the rate at which the multiple processors are reading from or writing to flash memory to determine priorities of requests for access of the flash memory. Advantageously, such logic can improve overall processing capacity of each of the multiple processors and allow for preemption of ongoing access requests for other high-priority access requests without the use of multiple flash memories.

In an example embodiment, a system is provided. The system includes memory access circuitry and processing circuitry coupled to the memory access circuitry. The memory access circuitry is configured to receive a read request corresponding to a set of instructions for execution by processing circuitry stored in non-volatile memory, determine whether to preempt current access to the non-volatile memory corresponding to one or more access requests in favor of the read request based on a priority of the read request relative to the one or more access requests, obtain the set of instructions from the non-volatile memory, and supply the set of instructions to the processing circuitry. The processing circuitry executes the set of instructions.

In another example, memory access circuitry is provided. The memory access circuitry includes interface circuitry and access circuitry coupled to the interface circuitry. The interface circuitry is configured to receive a read request corresponding to a set of instructions executable by processing circuitry stored in non-volatile memory and provide an indication of the read request to the access circuitry. The access circuitry is configured to determine whether to preempt current access to the non-volatile memory corresponding to one or more access requests in favor of the read request based on a priority of the read request relative to the one or more access requests, obtain the set of instructions from the non-volatile memory, and supply the set of instructions to the processing circuitry.

In yet another embodiment, a method is provided. The method includes receiving a read request corresponding to a set of instructions executable by processing circuitry stored in non-volatile memory, determining whether to preempt current access to the non-volatile memory corresponding to one or more access requests in favor of the read request based on a priority of the read request relative to the one or more access requests, obtaining the set of instructions from the non-volatile memory, and supplying the set of instructions to the processing circuitry.

FIG. 1 illustrates an example environment for scheduling access to memory in accordance with an implementation. FIG. 1 shows operating environment 100, which includes system 110, non-volatile memory 120, and random access memory (RAM) 130. System 110 includes memory access circuitry 112, processing circuitry 114, and memory 116. Non-volatile memory 120 includes XIP code 122, read-only data 124, and loadable instructions 126. Memory access circuitry 112 can provide processing circuitry 114 access to non-volatile memory 120 and RAM 130. To provide such access, memory access circuitry 112 may be configured to execute access processes, such as process 200 of FIG. 2. System 110 is representative of a processing system, such as a microcontroller unit (MCU), that includes various hardware elements configured to execute access processes, software, and/or firmware to enable functionality based on the execution thereof. System 110 includes memory access circuitry 112, processing circuitry 114, and memory 116 that stores code 117 and data 118. System 110 may be coupled with non-volatile memory 120 and RAM 130, which system 110 may use to execute application code (e.g., code 117). System 110 may further be coupled with one or more peripherals (not shown) that can obtain results and data from executions of application code to enable functionality of the one or more peripherals.

Memory access circuitry 112 is representative of one or more hardware components configured to provide processing circuitry 114 with access to memory 116, non-volatile memory 120, and RAM 130 for the execution of application code. For example, memory access circuitry 112 may be a hardware accelerator (HWA) that includes hardware elements coupled to receive access requests (e.g., reads, writes) from processing circuitry 114 and coupled to provide access to memory 116, non-volatile memory 120, and RAM 130 based on the access requests and a schedule, or prioritization queue, thereof. Memory access circuitry 112 may further include one or more interfaces for which to communicate with memory 116, non-volatile memory 120, and RAM 130. For example, memory access circuitry 112 may include one or more serial peripheral interfaces (SPIs), expanded serial peripheral interfaces (xSPIs), or octal serial peripheral interfaces (OSPIs).

Processing circuitry 114 is representative of one or more processors or processing cores capable of executing software and firmware, such as code 117 and/or XIP code 122. Such processor(s) may include microcontrollers, DSPs, general purpose central processing units, application specific processors or circuits (e.g., ASICs), and logic devices (e.g., FPGAs), as well as any other type of processing device, combinations, or variations thereof. Code 117 may be initially stored in non-volatile memory 120 and copied to memory 116 for execution by the processing circuitry 114, whereas XIP code 122 is configured to be executed directly out of the non-volatile memory without first being copied to memory 116. In executing code 117 or XIP code 122, processing circuitry 114 may attempt to access memory 116 or non-volatile memory 120, respectively. An access attempt may refer to a read request whereby processing circuitry 114 reads instructions or data 118 from one or more addresses of memory 116 or non-volatile memory 120 to perform processing or computations using the instructions or data 118, or the access attempt may refer to a write request whereby processing circuitry 114 writes data 118 to one or more addresses of memory 116 or non-volatile memory 120.

Memory 116 is representative of computer-readable storage media located on system 110. For example, memory 116 may be representative of level-one (L1) RAM, tightly-coupled memory (TCM), or another type of memory. Although only one block is illustrated in operating environment 100, memory 116 may be implemented as multiple memories functioning in an integrated or separate manner. Memory 116 may store code 117 and data 118. Code 117 may include application code, such as instructions that, when executed by processing circuitry 114, enable functionality. Data 118 may include results and/or other information related to code 117, XIP code 122, loadable instructions 126, or the like. Processing circuitry 114 may access memory 116 via memory access circuitry 112 to execute code 117 thereon.

Non-volatile memory 120 is representative of non-volatile computer-readable storage media located externally with respect to system 110. For example, non-volatile memory 120 may represent flash memory. Non-volatile memory 120 may be included to provide additional capacity to store instructions and data storage. Non-volatile memory 120 stores XIP code 122, read-only data 124, and loadable instructions 126.

XIP code 122 includes different program instructions relative to program instructions of code 117. By way of example, code 117 may include a first set of instructions executable by processing circuitry 114 while XIP code 122 may include a second set of instructions, different from the first set of instructions, executable by processing circuitry 114 directly from non-volatile memory 120. Thus, XIP code 122 may represent instructions that can be executed from non-volatile memory 120 without prior loading of XIP code 122 onto memory 116 or RAM 130.

Read-only data 124 includes data stored on non-volatile memory 120 different from data 118 stored in memory 116. For example, read-only data 124 may include results corresponding to executions of XIP code 122, initialization information related to non-volatile memory 120, or the like.

Loadable instructions 126 include initialization information and data related to the start-up of RAM 130. For example, when system 110 boots up (i.e., processing circuitry 114 executes boot code from read-only memory (ROM) (not shown)), system 110 can obtain loadable instructions 126 from non-volatile memory 120 to configure RAM 130 and execute code from RAM 130.

RAM 130 is representative of volatile computer-readable storage media. RAM 130 may include static RAM (SRAM), dynamic RAM (DRAM), or another type of memory, such as double data rate (DDR). System 110 can be coupled with RAM 130 and execute code 117 from RAM 130. In some examples, code 117, among other information and data, may be moved into RAM 130 prior to an execution of instructions by processing circuitry 114 from RAM 130.

In operation, system 110 can receive a processing request to execute program instructions from a peripheral (not shown). The program instructions may include operations and addresses associated with non-volatile memory 120 (e.g., XIP code 122) and different operations and addresses associated with RAM 130 (e.g., code 117). In response to receiving the request, processing circuitry 114 can be configured to perform one or more requests to access non-volatile memory 120 and/or RAM 130 based on the operations and addresses in the program instructions.

By way of example, a first portion of the program instructions may include a first access request to read data from RAM 130. Accordingly, processing circuitry 114 can attempt to read the corresponding data from RAM 130 via memory access circuitry 112. Memory access circuitry 112, in response to the attempt to read from RAM 130, can allow the read request from RAM 130, and processing circuitry 114 can read the respective data from RAM 130.

By way of another example, a second portion of the program instructions may include a second access request to read read-only data 124 from non-volatile memory 120. Accordingly, processing circuitry 114 can attempt to read the corresponding read-only data 124 from non-volatile memory 120 via memory access circuitry 112. Memory access circuitry 112 can determine whether there are other ongoing requests for access to non-volatile memory 120, and in response to determining that there are not other ongoing requests, allow processing circuitry 114 to read read-only data 124 from RAM 130.

Following the previous example, a third portion of the program instructions may include a third access request to execute XIP code 122 from non-volatile memory 120. At the time this third access request is received, the second access request related to a read of read-only data 124 from non-volatile memory 120 may be ongoing, or, in other words, processing circuitry 114 may still be reading read-only data 124 from non-volatile memory 120 at this time. Memory access circuitry 112 may identify both the second access request and the third access request and identify a priority of the third access request relative to the second access request.

In some examples, memory access circuitry 112 may determine the priorities of the requests based on a state of processing circuitry 114. This may entail determining a request type (such as a read, a write, or an execute), a mode of processing circuitry 114 at the time of the request (such as an operating mode, an exception mode, a secured mode, a privileged mode, or whether processing circuitry 114 has made the request in response to receiving an interrupt from a peripheral), among other factors, such as whether there has been a user-defined signal provided to memory access circuitry 112 indicating high-priority. In other examples, memory access circuitry 112 may determine the priorities of the requests based on the addresses sought to be written to or read from in the two access requests. In some other examples, memory access circuitry 112 may determine the priorities based on both methods described. Alternatively, memory access circuitry 112 may identify that the third request corresponds to an execution of XIP code 122, so memory access circuitry 112 can escalate the third access request regardless of other ongoing access.

Still referring to this example, memory access circuitry 112 may determine that the priority of the third access request related to the execution of XIP code 122 has a higher priority relative to the second access request related to the reading of read-only data 124. Accordingly, memory access circuitry 112 may preempt the ongoing read request and allow processing circuitry 114 to execute XIP code 122 before the read request is complete. Following the execution of XIP code 122 from non-volatile memory 120, memory access circuitry 112 can resume the second access request whereby processing circuitry 114 can continue reading data 124 from non-volatile memory 120. For example, in such cases, memory access circuitry 112 may store context related to the preempted access request and restore the context following the execution of XIP code 122 upon resumption of the initial access request.

These examples discuss only a few situations and a few types of access requests, however, any combination or variation of request for access to different types of memory may be contemplated. Regardless of the request type, memory access circuitry 112 can prioritize access to non-volatile memory 120 to ensure that requests are performed in an order that at least increases processing efficiency of processing circuitry 114 by following a prioritization scheme. In various examples, processing circuitry 114 may include multiple processing circuits or cores. Each processing circuit may attempt to access non-volatile memory 120 simultaneously. Thus, memory access circuitry 112 may prioritize access among each of the processing circuits.

Figure 2:
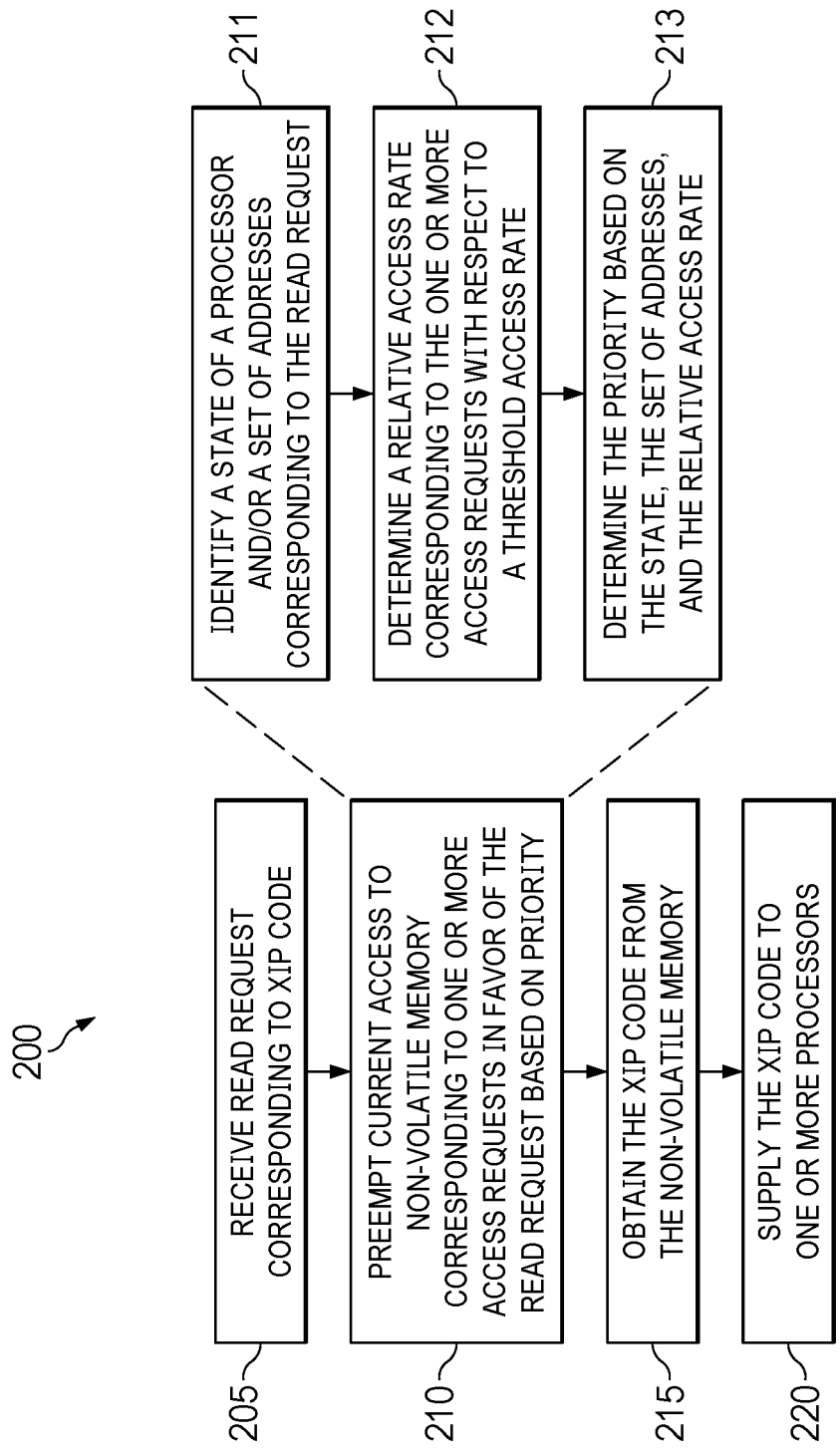
FIG. 2 illustrates a series of steps for preempting access to memory in favor of another access request in an implementation.

FIG. 2 illustrates a series of steps for preempting access to memory in favor of another access request in an implementation. FIG. 2 includes process 200 described below, which references elements of FIG. 1. Process 200 can be implemented on software, firmware, and/or fixed-purpose hardware, or any combination or variation thereof. For example, memory access circuitry, such as memory access circuitry 112 of FIG. 1, can execute process 200.

In operation 205, memory access circuitry 112 receives a read request corresponding to XIP code 122 of non-volatile memory 120. Processing circuitry 114, representative of one or more processors or processing cores capable of executing software and firmware, can provide the read request in an attempt to read XIP code 122 from non-volatile memory 120 when tasked with executing program instructions per a command from a peripheral. In executing such program instructions, processing circuitry 114 may attempt to access non-volatile memory 120 or RAM 130 to execute XIP code 122 or code 117, respectively. In this example, a first processing core of processing circuitry 114 can attempt to read one or more chunks of XIP code 122 for execution thereof.

In operation 210, memory access circuitry 112 preempts current access to non-volatile memory 120 corresponding to one or more access requests of non-volatile memory 120 in favor of the read request based on a priority of the read request relative to the one or more access requests. Current access may refer to concurrent or simultaneous access of non-volatile memory 120 whereby a processing core of processing circuitry 114 attempts to read from or write to non-volatile memory 120 at the same time, or during an overlapping time frame, as a different processing core of processing circuitry 114. For example, one or more processing cores of processing circuitry 114 may be accessing non-volatile memory 120 at the time when the first processing core attempts to read the one or more chunks of XIP code 122. Accordingly, memory access circuitry 112 may be configured to determine the priority of the read request from the first processing core to determine whether to preempt the current access of non-volatile memory 120.

To determine the priority of the read request corresponding to the execution of XIP code 122, among other access requests, memory access circuitry 112 may follow a prioritization scheme. The prioritization scheme may, generally, identify real-time executions of XIP code 122 as highest priority relative to other access requests, such as large read requests, write requests, and best-effort (i.e., not real-time) executions of XIP code 122. In the prioritization scheme, write requests may be considered the lowest priority. However, in various examples, memory access circuitry 112 may preempt large read requests and best-effort requests in favor of a write request. Other scenarios may be contemplated with regards to prioritization and preemption. By way of example, memory access circuitry 112 may identify, in operation 211, a state of the processing cores accessing non-volatile memory 120 and/or identify a set of addresses corresponding to the read request. Determining the state of the processing cores may entail identifying a request type, such as a read, a write, or an execute, a mode of the processing core at the time of the request, such as an operating mode, an exception mode, a secured mode, a privileged mode, or whether the processing core has made the request as an interrupt event, among other factors, such as whether there has been a user-defined signal provided to memory access circuitry 112 indicating high-priority. Memory access circuitry 112 may instead, or in addition, determine the priority of the read request based on the addresses sought to be accessed by the first processing core. For example, memory access circuitry 112 may flag designated addresses as higher or lower priority than other addresses. In some other examples, memory access circuitry 112 may determine both the state and the addresses.

In operation 212, memory access circuitry 112 can determine a relative access rate corresponding to the one or more access requests with respect to a threshold access rate to determine the priority. Access rate may refer to a write speed, or progression rate, at which a processing core writes to non-volatile memory 120 relative to a clock signal. The threshold access rate may be a user-defined, pre-configured value. Memory access circuitry 112 can compare the access rates of ongoing access requests to the threshold access rate to determine whether the ongoing access requests are below, meet, or exceed the threshold access rate. In various examples, operation 212 may be used to determine whether to escalate priority of a write request among other access requests. Accordingly, operation 212 may be optional as the memory access circuitry 112 is determining whether to escalate an access request related to the execution of XIP code 122. However, operation 212 may also be used to determine whether to escalate other types of access request.

In operation 213, memory access circuitry 112 determines the priority based on the state, the set of addresses, and/or the relative access rates. By way of example, memory access circuitry 112 may determine that the first processing core that provided the read request is functioning in an operating mode, and thus, the read request relates to a real-time XIP request. Accordingly, memory access circuitry 112 may determine that the read request has a higher priority than other ongoing access requests. By way of another example, memory access circuitry 112 may determine that the first processing core is attempting to execute a portion of XIP code 122 at a set of high-priority addresses. Thus, the portion of XIP code 122 may be a critical section of program instructions. Accordingly, memory access circuitry 112 can determine that the read request has a higher priority than other ongoing access requests. By way of yet another example, memory access circuitry 112 may determine that the other processing cores are writing to non-volatile memory 120 at a rate greater than the threshold access request. In such cases, memory access circuitry 112 can determine that the read request has a higher priority than the other ongoing access requests, especially because the other access requests are accessing non-volatile memory 120 at a rate sufficient to not incur latency elsewhere in the processing system. Any combination or variation of prioritization methods may be used, and memory access circuitry 112 may weigh results from each method in a manner to improve code execution performance.

After memory access circuitry 112 determines that the priority of the read request from the first processing core is higher than the other ongoing access request, memory access circuitry 112 can preempt access to non-volatile memory 120 in favor of the read request. This may entail preventing or stopping access to non-volatile memory 120 with respect to the other processing cores and respective access requests. Although access may be temporarily stopped, memory access circuitry 112 may store context (e.g., addresses, data, instructions) of the stopped access, so that memory access circuitry 112 can resume access from the same point after access is resumed at a later time.

Next, in operation 215, memory access circuitry 112 obtains XIP code 122 from non-volatile memory 120. Memory access circuitry 112 can identify the set of addresses corresponding to the read request and interface with non-volatile memory 120 to obtain XIP code 122, or chunks thereof.

In operation 220, memory access circuitry 112 supplies XIP code 122 to processing circuitry 114, or more specifically in this example, to the first processing core of processing circuitry 114. In various examples, processing circuitry 114 may read and execute the chunks of XIP code 122 directly on non-volatile memory 120. As a result of executing XIP code 122, processing circuitry 114 can output one or more results related to the execution of XIP code 122 for use downstream, such as by one or more peripheral devices.

In some cases, process 200 may not be applied to access requests for executing XIP code 122. Rather, such access requests may automatically be escalated to the highest priority and acted upon immediately by memory access circuitry 112 and processing circuitry 114 based on the prioritization scheme. In such cases, process 200 may apply to access requests other than those related to executing XIP code 122 (i.e., large reads of read-only data 124, writes, best-effort XIP requests). However, in other cases, process 200 may apply to any access requests from any number of processors.

Figure 3:
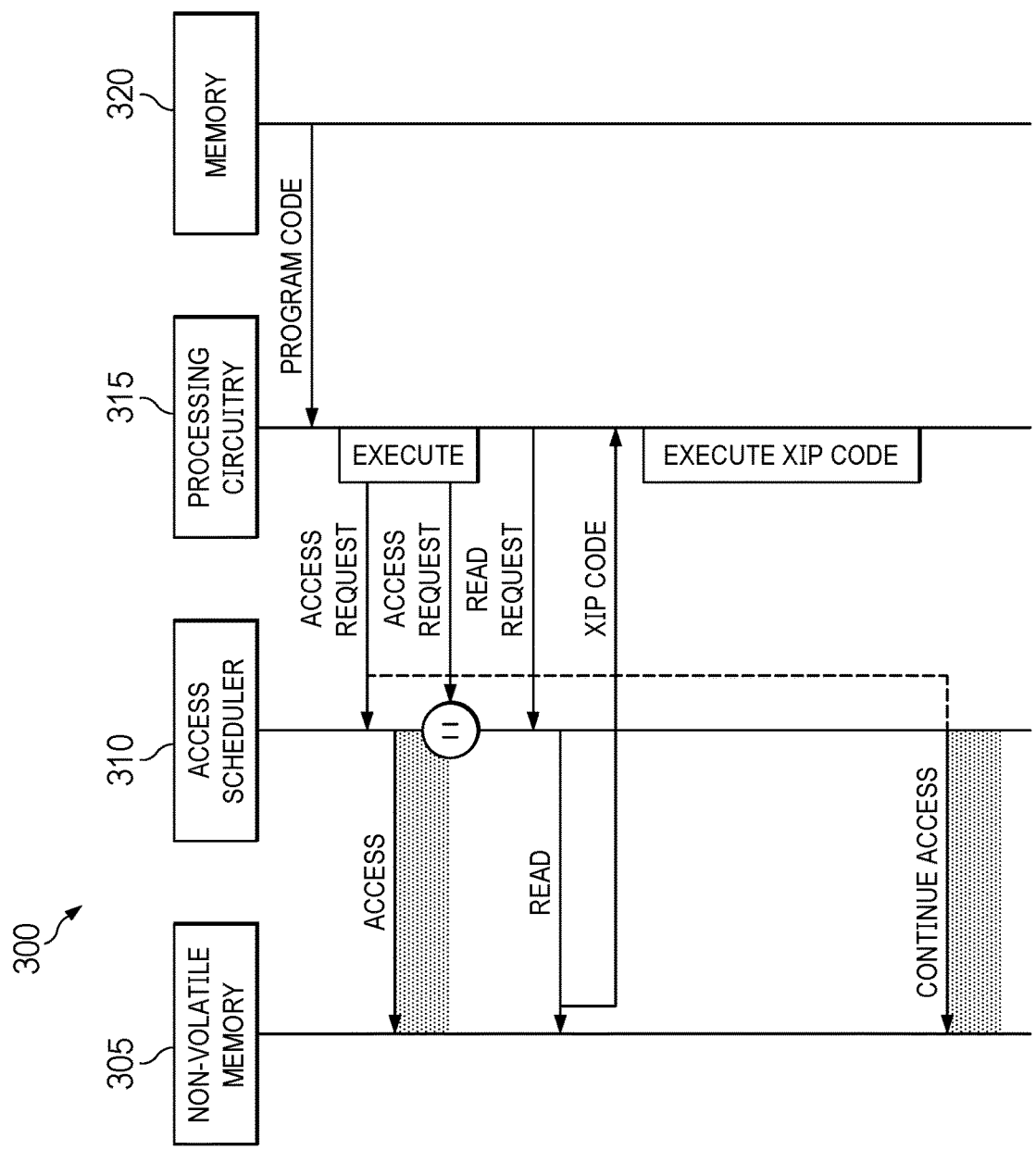
FIG. 3 illustrates an example sequence diagram demonstrating access between elements of a system in accordance with an implementation.

FIG. 3 illustrates an example sequence diagram demonstrating access between elements of a system in accordance with an implementation. FIG. 3 includes operating environment 300, which includes non-volatile memory 305, access scheduler 310, processing circuitry 315, and memory 320. The elements of operating environment 300 may be representative of elements of operating environment 100, such as non-volatile memory 120, memory access circuitry 112, processing circuitry 114, and memory 116 and RAM 130, respectively.

At a first time, a peripheral coupled to a processing system, including elements of operating environment 300, may initiate an execution of program code. Processing circuitry 315, representative of one or more processing cores, may obtain program code from memory 320. The program code may include instructions and addresses corresponding to the instructions in memory 320 and/or non-volatile memory 305. In some examples, memory 320 may be on-chip memory, such as level-one (L1) RAM, tightly-coupled memory, or another type of memory (e.g., memory 116 of FIG. 1). In other examples, memory 320 may be level-two (L2) RAM accessible to processing circuitry 315 (e.g., RAM 130 of FIG. 1). Processing circuitry 315 can execute program code, or chunks thereof, which may cause processing circuitry 315 to provide an access request to access scheduler 310 to access (e.g., read or write) non-volatile memory 305.

Access scheduler 310 is representative of one or more hardware components configured to provide processing circuitry 315 with access to one or more memories in a system, such as memory 320 and non-volatile memory 305, for the execution of program code and XIP code. For example, access scheduler 310 may be a hardware accelerator (HWA) that includes hardware elements coupled to receive access requests (e.g., reads, writes) from processing circuitry 315 and coupled to provide access to memory 320 and non-volatile memory 305 based on the access requests and a schedule, or queue, thereof. Access scheduler 310 may further include one or more interfaces for which to communicate with memory 320 and non-volatile memory 305 (e.g., SPI, OSPI, xSPI).

Access scheduler 310 may allow processing circuitry 315 to access non-volatile memory 305 for a duration, such as until processing circuitry 315 has finished executing the program code or until an interrupt, a jump in addresses, or higher priority, intervening event occurs. In the example shown in FIG. 3, processing circuitry 315 may provide a further access request to access scheduler 310 while executing the program code. This access request may include a read request corresponding to XIP code stored in non-volatile memory 305. As illustrated, this access request may occur while processing circuitry 315 is accessing non-volatile memory 305 via the previous access request. When access scheduler 310 receives the read request, access scheduler 310 may determine that the priority of the read request is higher than the priority of the previous, ongoing access request, so access scheduler 310 can preempt the access request and pause access to non-volatile memory 305 with respect to the first access request. Once access scheduler 310 pauses the first access request, access scheduler 310 can allow processing circuitry 315 to read XIP code from non-volatile memory 305. Processing circuitry 315 can execute the XIP code from non-volatile memory 305.

Upon completion of the execution of the XIP code from non-volatile memory 305, access scheduler 310 can resume access to non-volatile memory 305 corresponding to the first access request that was previously paused.

Figure 4:
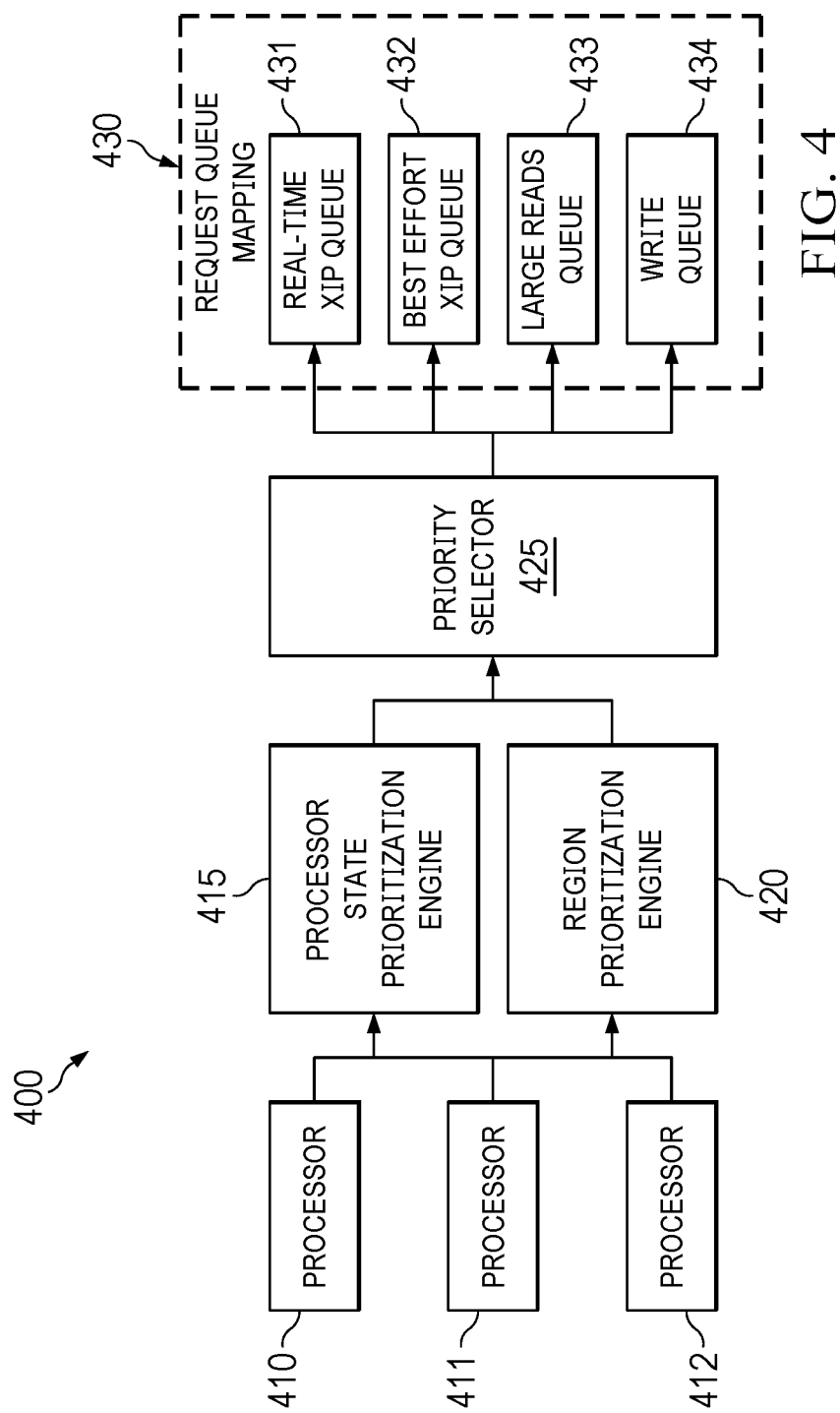
FIG. 4 illustrates an example operating environment configurable to perform memory access prioritization in an implementation.

FIG. 4 illustrates an example operating environment configurable to perform memory access prioritization in an implementation. FIG. 4 includes operating environment 400, which includes processors 410, 411, and 412, processor state prioritization engine 415, region prioritization engine 420, priority selector 425, and request queue mapping 430.

Processors 410, 411, and 412 are representative of any type of processors or processing cores of a system (e.g., a microcontroller unit) capable of executing software and firmware. Examples of such processor(s) may include general purpose central processing units, application specific processors or circuits (e.g., ASICs), and logic devices (e.g., FPGAs), as well as any other type of processing device, combinations, or variations thereof. For example, processors 410, 411, and 412 may embody multiple processing cores of processing circuitry 114 of FIG. 1 or processing circuitry 315 of FIG. 3. Although three processors are shown in operating environment 400, any number of processors may be used in a system.

In various examples, processors 410, 411, and 412 may each be configured to execute different chunks of application code to enable functionality of a system. Processor 410 may be configured to execute a first set of instructions corresponding to the application code, processor 411 may be configured to execute a second set of instructions corresponding to the application code, and processor 412 may be configured to execute a third set of instructions corresponding to the application code. Accordingly, each of processors 410, 411, and 412 may attempt to access one or more memories (e.g., non-volatile memory and/or volatile memory) in the execution of the application code. As processors 410, 411, and 412 attempt to access a non-volatile memory (e.g., non-volatile memory 120 of FIG. 1), processors 410, 411, and 412 can provide an access request to processor state prioritization engine 415 and/or region prioritization engine 420.

Processor state prioritization engine 415 and region prioritization engine 420 are representative of one or more hardware components configured to identify attempts to access non-volatile memory, among other types of memory, by processors 410, 411, and 412. Both processor state prioritization engine 415 and region prioritization engine 420 may identify the attempts and prioritize the attempts based on different criteria. In some cases, only one of processor state prioritization engine 415 and region prioritization engine 420 may be used in a system, however, in other cases, both may be used to determine priority among several access requests. In cases when both are used, the overall priority may be determined based on a higher priority among priorities output by processor state prioritization engine 415 and region prioritization engine 420. Alternatively, the selection of using either or both processor state prioritization engine 415 and region prioritization engine 420 may be chosen statically for any access requests or dynamically on a per-request basis.

Processor state prioritization engine 415 may prioritize the access requests based on states of processors 410, 411, and 412. The states of processors 410, 411, and 412 may include an operating state, an exception state, a secured state, a privileged state. The states may be determined based on the type of access requested (e.g., read, write, execute), a mode of the processor, and/or any other user-defined signal accompanying an access request at the time of requested access. Accordingly, processor state prioritization engine 415 may identify respective states of processors 410, 411, and 412, and categorize or rank access requests based on the states. Region prioritization engine 420 may prioritize the access requests based on the addresses processors 410, 411, and 412 are attempting to access. Region prioritization engine 420 may be pre-configured with a mapping or list of addresses and corresponding priorities. For example, some sets of addresses may be flagged as higher priority than other sets of addresses. Region prioritization engine 420 can identify the addresses associated with the access requests and prioritize the access requests accordingly.

Priority selector 425 is representative of one or more hardware components configured to receive the access requests and corresponding priorities from processor state prioritization engine 415 and region prioritization engine 420 and sort the access requests into two or more categories (e.g., request queue mapping 430) based on the priorities. In various examples, priority selector 425 may be configured with pre-configured, user-defined rules and thresholds for sorting the access requests. Priority selector 425 may create request mapping queue 430 and sort the access requests into real-time XIP queue 431, best effort XIP queue 432, large reads queue 433, and write queue 434.

Request mapping queue 430 is representative of a categorized mapping of the access requests from processors 410, 411, and 412, corresponding addresses, and corresponding priorities. Real-time XIP queue 431 may include access requests related to real-time executions of XIP code in non-volatile memory. Real-time executions of XIP code refer to executions of sets of program instructions executable by processors 410, 411, and/or 412 directly from non-volatile memory (i.e., not from RAM) as part of a real-time processing loop in application code that may be required to be completed within a time interval. Best effort XIP queue 432 may include access requests related to non-real-time executions of XIP code in non-volatile memory. For example, a best effort XIP execution may refer to an execution of a set of program instructions from non-volatile memory that produces results that may not be immediately usable downstream or by processors 410, 411, or 412 in other executions of the application code. In other words, best effort XIP requests may be more tolerant to delays with respect to accessing non-volatile memory. Large reads queue 433 may include access requests for reading chunks of data in non-volatile memory beyond a threshold amount. The threshold amount may be a user-defined, pre-configured amount that priority selector 425 can compare against. Write queue 434 may include access requests for writing data in non-volatile memory.

Each queue may be assigned an overall priority relative to other queues, and each request within a queue may have a priority relative to other requests within the respective queue. For example, real-time XIP queue 431 may have the highest priority among the queues in request mapping queue 430. Best effort XIP queue 432 may have the second highest priority. Large reads queue 433 may have the third highest priority. Write queue 434 may have the lowest priority. In some cases, however, write queue 434 may have the second highest priority if the rate at which a processor is writing data to non-volatile memory falls below a threshold rate. In such cases, an access scheduler (e.g., access scheduler 310, memory access circuitry 112) may determine that the write rate is too slow relative to the threshold rate and increase priority of write requests among other requests. Any combination, variation, or ordering of priorities may be contemplated.

Figure 5:
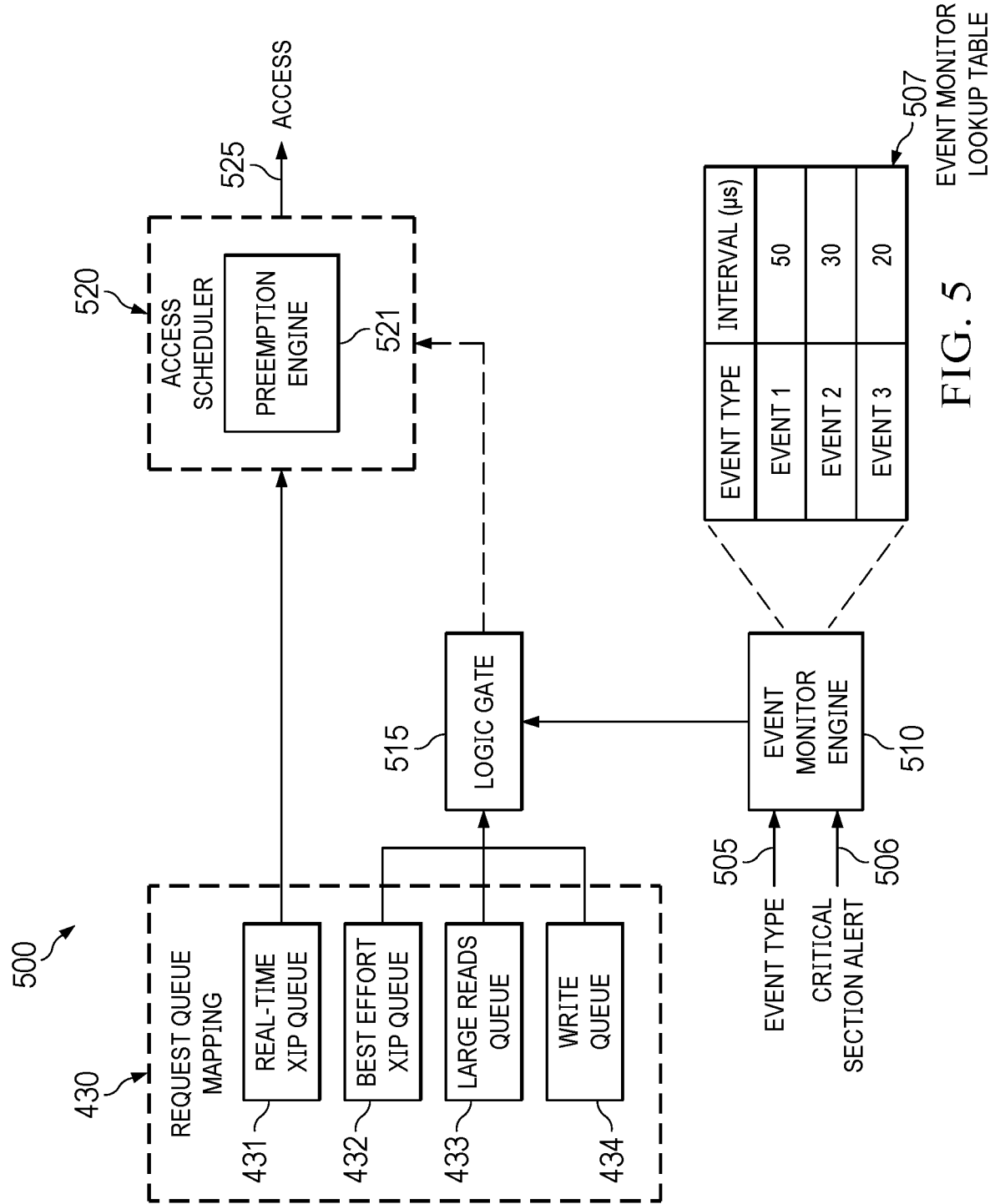
FIG. 5 illustrates an example operating environment configurable to perform memory access prioritization and scheduling in an implementation.
Figure 6:
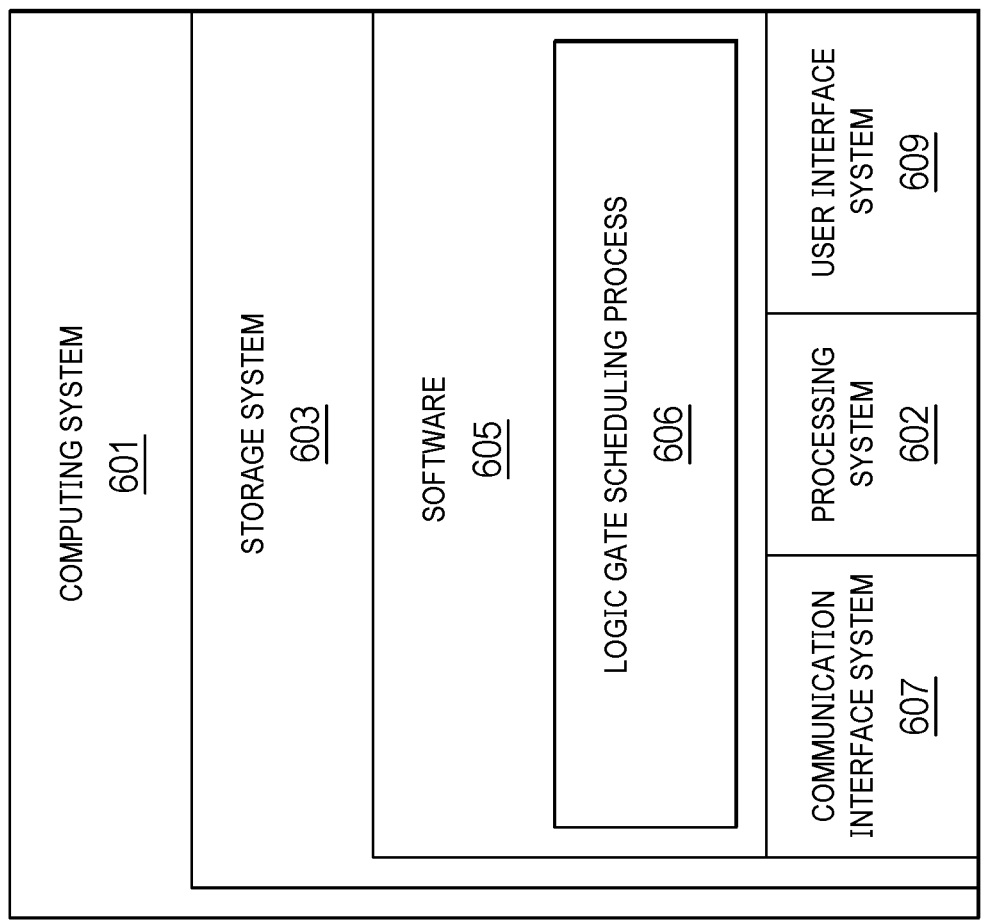
FIG. 6 illustrates a computing device that may be used in accordance with some examples of the present technology.

FIG. 5 illustrates an example operating environment configurable to perform memory access prioritization and scheduling in an implementation. FIG. 5 includes operating environment 500, which includes request queue mapping 430 of FIG. 4, event monitor engine 510, logic gate 515, and access scheduler 520.

In operation, access requests from one or more processors (e.g., processors 410, 411, and 412) can be categorized and prioritized among request queue mapping 430. Access requests of request queue mapping 430 can feed into logic gate 515 and/or access scheduler 520 based on a type of categorization within request queue mapping 430 (real-time XIP queue 431, best effort XIP queue 432, large reads queue 433, write queue 434). For example, real-time XIP access requests categorized in real-time XIP queue 431 may flow directly to access scheduler 520. Other requests categorized in best effort XIP queue 432, large reads queue 433, and write queue 434, however, may flow through logic gate 515 before flowing to access scheduler 520.

Logic gate 515 is representative of one or more circuits, logic devices, switches, or the like that can be controlled by event monitor engine 510 to turn "off" to allow access requests from best effort XIP queue 432, large reads queue 433, and write queue 434 to flow to access scheduler 520 or turn "on" and prevent access scheduler 520 from receiving such access requests.

Access scheduler 520 is representative of one or more hardware components configured to provide processor(s) (e.g., processors 410, 411, and 412 of FIG. 4, processing circuitry 114 of FIG. 1) with access 525 to non-volatile memory (e.g., non-volatile memory 120 of FIG. 1) for the execution of XIP code (e.g., XIP code 122). For example, access scheduler 520 may be a hardware accelerator (HWA) that includes hardware elements coupled to receive access requests, categorized into request queue mapping 430, from the processor(s) and coupled to provide access 525 to non-volatile memory. Access scheduler 520 may include preemption engine 521 among other components and elements, such as interfaces for communicating with memory (not shown).

Preemption engine 521 may be configured to preempt or resume access 525 to non-volatile memory based on access requests and corresponding priorities among the access requests. For example, access scheduler 520, at a first time, may allow a processor to access non-volatile memory in accordance with request queue mapping 430. At a second time, however, access scheduler 520 may identify a higher priority (relative to the access at the first time) access request. Accordingly, preemption engine 521 may pause the ongoing access from the first time, allow access related to the higher priority access request at the second time, then resume the access from the first time and with the same context following completion of the access from the second time. Advantageously, preemption engine 521 can manage a schedule of access requests so that not only are critical executions performed on time but also writing and reading of data can be performed at sufficient rates or within certain time frames so as to not create latency in the performance of the system.

Event monitor engine 510 is representative of one or more components of a system configured to identify event type 505 and critical section alert 506 and control logic gate 515 based on event type 505 and critical section alert 506. Event monitor engine 510 may, in effect, allow and/or prevent certain access to non-volatile memory based on event type 505 and critical section alert 506.

Event type 505 may refer to an interrupt event, such as from a peripheral device, a jump event, or any other event of high interest and priority, and thus, related to access requests categorized within request queue mapping 430. For each event identified by event monitor engine 510, event monitor engine 510 may implement a guard interval, which may include turning logic gate 515 on or off for a predetermined duration in accordance with event monitor lookup table 507. For example, for a high-priority interrupt event corresponding to a real-time XIP execution, event monitor engine 510 may direct logic gate 515 to turn on for an interval (e.g., 50 microseconds) to block access requests within best effort XIP queue 432, large reads queue 433, and write queue 434 from flowing to access scheduler 520. Event monitor engine 510 may then turn logic gate off so that other access requests may resume flowing to access scheduler 520. To do so, event monitor engine 510 may include logic that, when executed by event monitor engine 510, directs event monitor engine 510 to turn logic gate 515 on or off for an amount of time according to event monitor lookup table 507. By way of example, for a first event of event type 505 (e.g., event 1), event monitor engine 510 may identify event type 505, identify a time interval corresponding to event type 505, and turn logic gate 515 off for the amount of time identified in event monitor lookup table 507. While only "events" are displayed in event monitor lookup table 507, event monitor lookup table 507 may instead or in addition include interval times corresponding to critical section alert 506. Advantageously, this may allow access scheduler 520 to read only a real-time XIP access request from real-time XIP queue 431 associated with the interrupt event and allow one or more processors access 525 to non-volatile memory to execute the XIP code.

Critical section alert 506 may include a signal that an access request related to execution of XIP code, and thus, related to access requests categorized within request queue mapping 430, is associated with high-priority addresses or high-importance operations enabled by executing the XIP code. For example, event monitor engine 510 may include a binary memory-mapped register (MMR) identifying critical chunks of XIP code. If a processor attempts to execute any identified critical chunks, event monitor engine 510 may turn logic gate 515 on so that access scheduler 520 only receives the access request corresponding to the critical chunk of XIP code, and thus, allows access 525 based on the access request.

In various examples, event monitor engine 510 may perform such activities via hardware, software, firmware, or any combination or variation thereof.

While some examples provided herein are described in the context of a system-on-chip, processor, microcontroller unit, circuitry, environment, or the like, it should be understood that the memory access methods, techniques, and systems described herein are not limited to such examples and may apply to a variety of other processes, systems, applications, devices, and the like. Aspects of the present invention may be embodied as a system, method, computer program product, and other configurable systems. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising." and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some examples," "according to some examples," "in the examples shown," "in other examples," and the like generally mean the particular feature, structure, or characteristic following the phrase is included in at least one implementation of the present technology, and may be included in more than one implementation. In addition, such phrases do not necessarily refer to the same example or different examples.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A system, comprising:
    memory access circuitry configured to:
        receive a read request to obtain an instruction stored in non-volatile memory;
        determine whether to preempt current access to the non-volatile memory corresponding to another access requests based on a priority of the read request relative to the other access request; and
        based on a determination to preempt the current access, pause the current access to the non-volatile memory corresponding to the other access request; and
        process the read request to obtain the instruction from the non-volatile memory; and
    processing circuitry coupled to the memory access circuitry and configured to execute the obtained instruction.

2. The system of claim 1, wherein the memory access circuitry is further configured to determine the priority based on a state of the processing circuitry, and wherein the state of the processing circuitry includes one or more of an operating state, an exception state, a privileged state, or a secure state.

3. The system of claim 1, wherein the memory access circuitry is further configured to determine the priority based on a user-defined signal accompanying the read request.

4. The system of claim 1, wherein the memory access circuitry is further configured to determine the priority based on a first address corresponding to the instruction and a second address corresponding to the other access request.

5. The system of claim 1, wherein the other access request comprises one or more of a large read request, a write request, or a non-real-time read request corresponding to the instruction.

6. The system of claim 1, wherein the memory access circuitry is further configured to prioritize the current access to the non-volatile memory based on a prioritization scheme, wherein the prioritization scheme defines read requests corresponding to sets of instructions for execution by the processing circuitry as highest priority, non-real-time read requests corresponding to sets of instructions for execution by the processing circuitry as second highest priority, large read requests for data as third highest priority, and write requests as fourth highest priority.

7. The system of claim 6, wherein the memory access circuitry is further configured to escalate priority of the write requests above the non-real-time read requests and the large read requests based on determining that a write progression rate falls below a write progression threshold rate.

8. The system of claim 1, wherein the memory access circuitry is configured to resume the current access to the non-volatile memory after the processing circuitry executes the obtained instructions.

9. The system of claim 1, further comprising event monitoring circuitry coupled to the memory access circuitry and configured to provide the other access request to the memory access circuitry.

10. The system of claim 9, wherein the event monitoring circuitry is further configured to delay providing the other access request to the memory access circuitry for an interval time based on identifying that the other access request corresponds to a non-critical section of instructions for execution by the processing circuitry.

11. Memory access circuitry, comprising:
    interface circuitry; and
    access circuitry coupled to the interface circuitry;
    wherein the interface circuitry is configured to:
        receive a read request to obtain an instruction stored in non-volatile memory; and
        provide an indication of the read request to the access circuitry, and wherein the access circuitry is configured to:
        determine whether to preempt current access to the non-volatile memory corresponding to another access requests based on a priority of the read request relative to the other access request; and
        based on a determination to preempt the current access, pause the current access to the non-volatile memory corresponding to the other access request; and
        process the read request to obtain the instruction from the non-volatile memory.

12. The memory access circuitry of claim 11, wherein the access circuitry is further configured to determine the priority based on a state of processing circuitry.

13. The memory access circuitry of claim 12, wherein the state of the processing circuitry includes one or more of an operating state, an exception state, a privileged state, or a secure state.

14. The memory access circuitry of claim 11, wherein the access circuitry is further configured to determine the priority based on a user-defined signal accompanying the read request.

15. The memory access circuitry of claim 11, wherein the access circuitry is further configured to determine the priority based on a first set of address corresponding to the instruction and a second address corresponding to the other access requests.

16. The memory access circuitry of claim 11, wherein the other access request comprises a write request to the non-volatile memory, and wherein the access circuitry is configured to determine whether to preempt current access to the non-volatile memory corresponding to the other access request based on a write progression rate of the write request relative to a threshold write progression rate.

17. A method, comprising:
    receiving a read request to obtain an instruction from non-volatile memory;

determining whether to preempt current access to the non-volatile memory corresponding to another access request to obtain data from the non-volatile memory based on a priority of the instruction relative to the data;

based on determining to preempt the current access, pausing the current access to the non-volatile memory corresponding to the other access request; and processing the read request to obtain the instruction from the non-volatile memory; and supplying the instructions for execution.

18. The method of claim 17, comprises determining the priority based on a state of processing circuitry.

19. The method of claim 18, wherein the state of the processing circuitry includes one or more of an operating state, an exception state, a privileged state, or a secure state.

20. The method of claim 17, comprises determining the priority based on a first address corresponding to the instruction and a second address corresponding to the other access request.

* * * * *